Dec. 19, 1950  S. E. GOLIAN ET AL  2,534,710
BUOY SUPPORTED COLLAPSIBLE RADAR REFLECTOR
Filed May 8, 1946  2 Sheets-Sheet 1

INVENTORS
SERGE E. GOLIAN
ROBERT M. WHITMER
BY
M. O. Hayes
ATTORNEY

Dec. 19, 1950  S. E. GOLIAN ET AL  2,534,710
BUOY SUPPORTED COLLAPSIBLE RADAR REFLECTOR
Filed May 8, 1946  2 Sheets-Sheet 2

INVENTORS
SERGE E. GOLIAN
ROBERT M. WHITMER
BY

ATTORNEY

Patented Dec. 19, 1950

2,534,710

UNITED STATES PATENT OFFICE 2,534,710

BUOY SUPPORTED COLLAPSIBLE RADAR REFLECTOR

Serge E. Golian, Washington, D. C., and Robert M. Whitmer, Belmont, Mass., assignors, by mesne assignments, to the United States of America as represented by the Secretary of the Navy Application May 8, 1946, Serial No. 668,032

26 Claims. (Cl. 9—8)

This invention relates to a device for reflecting microwave radar energy and more particularly to a collapsible reflector which may be dropped into the sea to mark a location so that persons seeking the location with the aid of microwave radar are guided by reflections of microwave radar energy from the marker device.

With the advent of radar, there has developed a need for a small device which could be quickly thrown or dropped into the sea to provide an indication to a radar operator enabling the rapid determination of the location of the device and thus to take advantage of the peculiar capabilities of radar in providing information over more conventional methods. For instance, an airplane pilot may wish to mark a certain spot so that others may find the spot without it being necessary for him to remain there or for him to figure out the exact geographical position. Or the pilot may wish to leave a certain location momentarily but be able to return to it easily and accurately. The above are but two of the many novel uses that suggest themselves for such a device.

The general object of this invention is to provide a novel floatable reflector for radar microwave energy which may be dropped from any height into the sea.

A further object of this invention is to provide a reflector for radar microwave energy which may be collapsed and folded into a small space.

A still further object of this invention is to provide a novel method of erecting a collapsible radar reflector operable on contact with water.

These and further objects will be apparent from the following specification and drawings in which.

Figure 1:
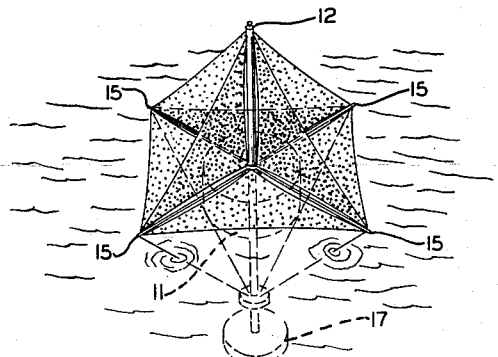
Fig. 1 is a perspective sketch of one embodiment of the invention as it floats upon the water in an erected position.

Referring to Fig. 1, there is shown a perspective view of this invention in a fully erected position. As shown, four similar arms 15 are joined to a mast 12 in a pivoted manner hereafter fully described in connection with Fig. 2. These arms which are pivotally mounted so that they may be folded parallel to mast 12 when the reflector is in a collapsed condition are so arranged about mast 12 as to be in a common plane and to include an angle of 90° between the adjacent arms when fully erected. In addition, the common plane in which the arms lie when fully erected is a plane perpendicular to the axial direction of mast 12. Eight triangular shaped reflector vanes are mounted upon the framework in such a manner as to provide a cluster of four trihedral reflector units.

More specifically, the support arms, which are pivotally mounted on mast 12, extend equally radial distances from the pivot points thereof and at right angles to each other so as to position the outer extremities thereof in equally spaced triangular relation to each other. Collapsible triangular reflector units are fastened to the outer extremities of the arms, the pivot point of the arms, and to the top of the mast. It will readily be understood that that portion of mast 12 extending above the pivot point of the arms is of the same length as that of the four similar arms. A float 11 is fastened to mast 12 and a counterweight 17 is hung below the float on mast 12 to insure that the device will be self-positioning upon contact with the water. That is to say, counterweight 17 acts in such a manner as to cause mast 12 to assume an upright position on the surface of the water. The triangular reflector surfaces are formed of a reflecting cloth or knitted wire so as to provide a collapsible structure which may be folded into a comparatively small space.

Figure 2:
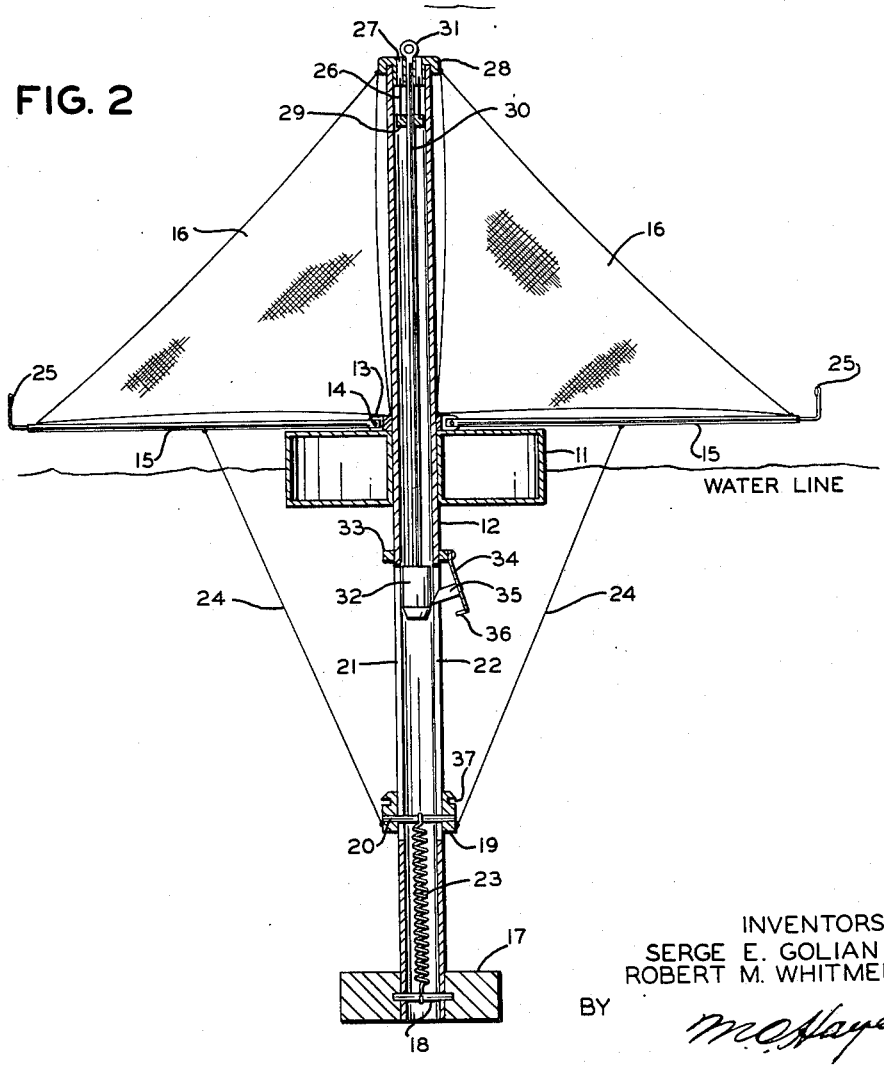
Fig. 2 is a sectional view of an embodiment of the invention employing impact inertia forces to accomplish erection when the device is dropped into the water.

Referring to Fig. 2, a hollow sealed float 11 is rigidly affixed to a hollow tubular mast 12. Hangar 13, one of four similar hangars, is rigidly mounted upon float 11. Pivoted at point 14 to hangar 13 is an arm 15, one of four similar arms, to which flexible reflecting cloth 16 is attached. The reflecting surfaces 16, which are preferably of triangular configuration, are fastened to the top of the mast, to the mast adjacent the pivot hubs and to the outer extremities of the arms so as to provide a cluster of trihedral reflector units symmetrically disposed about the mast when the reflector is in an erected position. A ballast weight 17 is rigidly affixed to the lower extremity of mast 12 means of a pin 18. The purpose of weight 17 is to stabilize the apparatus while it is floating. A collar 19 is slidably mounted upon mast 12 and carries with it a pin 20 which does not restrain the collar 19 from sliding up and down on mast 12 since it passes through a slot 21 and a slot 22 on diametrically opposite sides of mast 12. A tension spring 23 has its ends attached to pins 18 and 20 so that the collar 19 is always drawn downward toward weight 17 along the mast 12. A cord 24, one of four similar cords, is attached to collar 19 and to arm 15 thereby holding said arm 15 in an erected position which in turn maintains the reflecting cloth 16 under tension in an outstretched position.

While floating upon the surface of water in the erected position as described above, this device returns radar energy by means of multiple reflections over an inverse path independent of the direction from which the radar energy may come. In this manner the device acts as a buoy whose location is apparent to the radar operator by means of the reflected signal returning to the radar station from said device.

For carrying the device in aircraft the arm 15 is folded up alongside the mast 12. It is retained in a folded position by means of a hook 25, one of four similar hooks, which is engaged by a pin 26, one of four similar pins, when said pin 26 projects through an opening 27 in mast cap 28. Pin 26 is a slide fit in opening 27. Pin 26 is rigidly affixed to a collar 29 which in turn is rigidly affixed to a rod 30 having a hanging ring 31 at its upper extremity. The rod 30 passes through an opening in the mast cap 28 with a slideable fit. The lower end of rod 30 is attached to an inertia plunger 32.

It can be readily understood that lifting upward on ring 31 causes pin 26 to slide up through opening 27 in the mast cap 28 until said pin 26 projects above the said mast cap 28 thereby engaging the hook 25 and retaining the reflector in a collapsed state.

A collar 33, upon which is mounted a flat spring 34, is rigidly attached to mast 12. This spring 34 has attached to it a wedge 35 which is caused to bear against the plunger 32 through slot 22 in mast 12. Also attached to the spring 34 is a dog 36.

It can readily be seen that when the ring 31 is lifted upward it also moves plunger 32 upward by means of rod 30 until said plunger 32 slides above wedge 35 and no longer prevents said wedge 35 from entering the mast 12 through the slot 22. Wedge 35 under pressure of spring 34 enters mast 12 through slot 22 when the plunger 32 is drawn upward. Dog 36 also moves inwardly, being carried along on spring 34 in response to the motion of wedge 35.

Now the process of folding the arm 15 up against the mast 12 causes the slideable collar 19 to be drawn upward on the mast 12 against the tension of spring 23 by means of the connection through cord 24. When in this position the dog 36 drops into an annular groove 37 in collar 19 so that the tension of spring 23 is transferred to the fixed collar 33 rather than on arm 15 through cord 24.

The folded position is the normal position in which the device is carried. Upon striking the water when it is dropped, the inertia plunger 32 is driven downward by the impact, simultaneously releasing the hook 25 and the collar 19 so that the arms are unfolded through the action of spring 23 and are held in the erected position.

Figure 3:
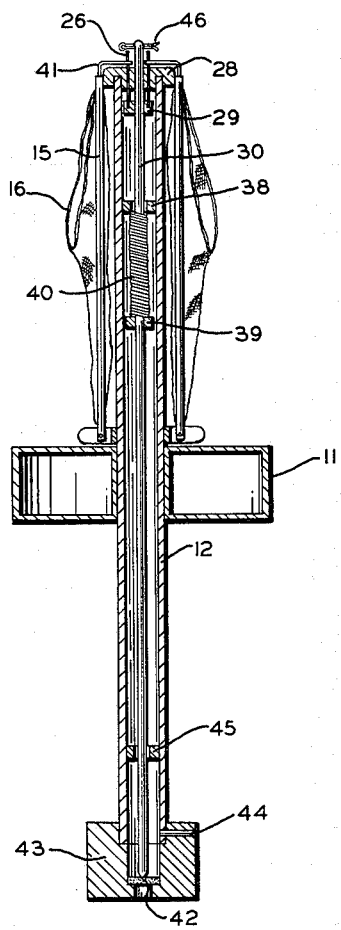
Fig. 3 is a sectional view of an alternative mast assembly employing a water soluble pill to initiate erection when the device is dropped into the water.

Referring to Fig. 3, an alternative embodiment of the invention employing a water soluble pill to initiate erection is shown in which a mast 12 has affixed to its upper extremity a cap 28 provided with a central opening through which a rod 30 may slide and a plurality of openings through which pin 26, one of a plurality of pins, may also slide. Pin 26 is mounted in a collar 29 which is rigidly affixed to the rod 30. A spring seat 38 is rigidly affixed to the inside of mast 12 and has a central opening through which rod 30 may slide. A collar 39 is pinned to rod 30 and is smaller than the inside of the mast 12 so it can slide up and down inside said mast 12. Between spring seat 38 and collar 29 is a compression spring 40 which tends to push the rod 30 downward carrying with it the collar 29 and pin 26. This will result in retracting the pin 26 into the mast cap 28 thereby releasing a hook 41 which holds an arm 15 in a folded position. However, in the folded position rod 30 is restrained from moving in response to pressure exerted on it by spring 40 by means of a soluble pill (salt tablet) 42 held in place at the lower extremity of the mast 12 by a retainer 43, said retainer 43 being held at the bottom extremity of the mast 12 by means of a bayonet lock 44 so as to be easily removable for the purpose of renewing the pill 42 which operation is necessary each time the device is operated. A guide block 45 is fastened to the inside of mast 12 and is provided with a central opening through which rod 30 may slide. Block 45 serves as a guide for rod 30. A cotter pin 46 located at the upper extremity of rod 30 serves to limit the movement of said rod 30 when the device is operated.

Figure 4:
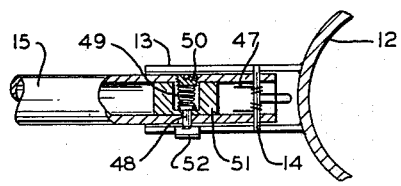
Fig. 4 is a sectional view of an alternative arm and hangar assembly employing an integral torsion spring to erect the arm and an automatic latch to hold the arm in the erected position.

Referring to Fig. 4, an alternative method for mounting the arms employing integral torsion springs and an automatic catch is shown in which a torsion spring 47 is mounted around the pivot pin 14 inside of the hollow end of arm 15 so that the ends of said spring 47 bear upon the inside of said arm 15 and on mast 12 tending to hold the arm 15 in an erected position. A shoulder locking pin 48 projects out of one side of arm 15. Pin 48 is under pressure from compression spring 49 which is retained by a set screw 50. The distance which pin 48 projects beyond arm 15 in response to pressure from spring 49 is limited by the shoulder incorporated on said pin 48. Pin 48, spring 49, and set screw 50 are suitably mounted inside of arm 15 by means of a filler block 51 rigidly fastened inside of arm 15. Part of hangar 13 is bent out forming an inclined surface 52 upon which the end of pin 48 bears when the arm 15 is erected. This forces the pin 48 inwardly against the pressure of spring 49. An opening slightly larger than the diameter of pin 48 is so located in the side of hangar 13 below bent portion 52 that the locking pin 48 will enter said opening when arm 15 reaches its fully erected position thereby automatically locking said arm 15 in the fully erected position.

The method of mounting the arms and providing the force necessary for their erection illustrated in Fig. 4 is well adapted for use with the soluble pill release mechanism illustrated in Fig. 3.

There has thus been provided a collapsible maritime buoy having a float and a plurality of arms of equal length pivotally mounted on a mast together with a spring arrangement for causing the arms to assume a fully erected position. It will readily be understood that the device will automatically erect when the arms are released from a folded position either by the inertia mechanism or the soluble release mechanism described. Since the arms lie in a plane perpendicular to the axis of the mast and perpendicular to each other in that plane, triangular reflecting surfaces mounted on the end of the arms, the mast adjacent the pivot points of the arms and the top of the mast will present a cluster of four trihedral reflectors when the arms are in an extended position.

While alternate release mechanisms have been disclosed and described, it is to be understood that various changes and modifications may be made in this invention without departing from the spirit and scope thereof as set forth in the appended claims.

What is claimed is:

1. A reflector for reflecting electromagnetic radiation comprising a mast, a plurality of support arms pivotally mounted on said mast, said arms presenting a multiplicity of outwardly projecting apices equidistant from a common center and equally spaced in a common plane substantially perpendicular to the axis of said mast when in an erected position, and a plurality of reflector members mounted on said arms and said mast presenting a cluster of trihedral reflector units when in an erected position.

2. A collapsible reflector for reflecting electromagnetic radiation comprising a mast, a plurality of support arms pivotally mounted on said mast extending radially equal distances from a common center and at right angles to each other thereby positioning the outer extremities of said arms in equally spaced triangular relation to each other, and reflector units fastened to the outer extremities of said arms, the outer extremity of said mast, and substantially to a common point on said mast, said units being so mounted as to present a cluster of trihedral reflector units when said arms are in a fully extended position.

3. A collapsible reflector for reflecting electromagnetic radiation comprising a mast, a plurality of arms pivotally mounted on said mast extending radially equal distances from a common center and at right angles to each other, and triangular reflector units mounted on said arms and said mast within triangular spaces defined by the outer ends of said arms and one extremity of said mast.

4. A reflector comprising a collapsible skeleton frame, a plurality of pliant reflecting surfaces having the inner apices thereof fastened together at substantially a common point and the outer apices thereof fastened to said frame in such manner as to cause said surfaces to be substantially mutually perpendicular upon erection of said frame, and means operable upon partial submergence in water to cause said frame to automatically erect.

5. A reflector comprising a collapsible skeleton frame, a plurality of pliant triangular reflecting surfaces having their inner apices fastened to said frame at substantially a common point, fastening means symmetrically positioned on said frame for securing the outer apices of said reflecting surfaces thereto, said means being so oriented as to cause said surfaces to present symmetrically disposed trihedral reflector units having substantially mutually perpendicular surfaces upon erection of said frame, and means operable upon submergence of said frame in water for causing said frame to automatically assume an erected position.

6. A reflector comprising a collapsible skeleton frame, a plurality of pliant reflecting surfaces having the inner apices thereof fastened together at substantially a common point on said frame and the outer apices thereof fastened to said frame in such manner as to cause said surfaces to be substantially mutually perpendicular upon erection of said frame, and inertia responsive means for causing said frame automatically to erect.

7. A reflector comprising a collapsible skeleton frame, a plurality of pliant triangular reflecting surfaces having the inner apices thereof fastened to said frame at substantially a common point, fastening means symmetrically positioned on said frame for securing the outer apices of said reflecting surfaces thereto, said means being so oriented as to cause said surfaces to present symmetrically disposed trihedral reflector units having substantially mutually perpendicular surfaces upon erection of said frame, and inertia responsive means for erecting said frame.

8. A reflector for reflecting electromagnetic radiation comprising a mast, a plurality of support arms pivotally mounted on said mast presenting a multiplicity of outwardly projecting apices equidistant from a common center and equally spaced in a common plane perpendicular to the axis of said mast when in an erected position, a plurality of reflector members mounted on said arms and said mast presenting a cluster of trihedral reflector units when in an erected position, and inertia responsive means for causing said arms to assume an erected position.

9. A reflector for reflecting electromagnetic radiation comprising a mast, a plurality of support arms pivotally mounted on said mast presenting a multiplicity of outwardly projecting apices equidistant from a common center and equally spaced in a common plane perpendicular to the axis of said mast when in an erected position, a plurality of reflector members mounted on said arms and said mast presenting a cluster of trihedral reflector units when in an erected position, and means operable upon submergence in water for automatically causing said arms to assume an erected position.

10. A collapsible maritime buoy for reflecting electromagnetic radiation comprising a mast, a float mounted on said mast, a plurality of arms pivotally mounted on said mast presenting a multiplicity of outwardly projecting apices equidistant from a common center and equally spaced in a common plane perpendicular to the axis of said mast when in an erected position, a plurality of collapsible reflector surfaces mounted on said apices and said mast presenting a cluster of trihedral reflector units when in an erected position, spring means for causing said arms to assume an erected position, means for retaining said arms in a collapsed position against the action of said spring means, and inertia responsive means for releasing said retaining means.

11. A collapsible maritime buoy for reflecting electromagnetic radiation comprising a mast, a float mounted on said mast, a plurality of arms pivotally mounted on said mast presenting a multiplicity of outwardly projecting apices equidistant from a common center and equally spaced in a common plane perpendicular to the axis of said mast when in erected position, a plurality of collapsible reflector surfaces mounted on said apices and said mast presenting a cluster of trihedral reflector units when in an erected position, spring means for causing said arms to assume an erected position, means for retaining said arms in a collapsed position against the action of said spring means, means responsive to submergence in water for releasing said retaining means, and means for automatically positioning said buoy in an upright position upon contact with water.

12. A reflector for microwave energy comprising a frame having a plurality of shaftlike members extending radially from a common center and at right angles to each other, reflecting surfaces supported on at least a portion of the members of said frame forming a plurality of trihedral reflecting units with substantially ninety degrees between the three surfaces of the respective trihedral reflecting units.

13. A target adapted to be supported, for reflecting a beam of radio-frequency energy directed thereto, and returning the same to an antenna; comprising a multipart frame having the parts thereof articulated for movement to and from a collapsed condition; a number of planar, foraminous metal vanes supported by the frame said vanes being disposed to present a planar surface to the beam in all directions; and means for holding the frame extended and the vanes in a taut condition.

14. A collapsible reflector for reflecting electromagnetic radiation comprising a mast, a plurality of support arms pivotally mounted on said mast extending radially equal distances from substantially a common center and at right angles to each other and to the mast thereby positioning the outer extremities of said arms in equally spaced relation to each other, and foraminous metal reflecting units fastened to the outer ends of the arms, the upper extremity of the mast and substantially to a point on the mast adjacent the pivot of the arms, and a foraminous metal reflecting means filling the space between the arms and lying in a plane generally perpendicular to the planes of said units thereby providing a cluster of trihedral units when the arms are extended.

15. A reflector for microwave energy comprising a skeleton frame having a plurality of members extending from a common center, reflecting surfaces supported on at least a portion of the members of said frame forming a plurality of trihedral reflecting units.

16. A reflector for microwave energy comprising a collapsible frame having a plurality of members extending radially from a common center when in an erected position, reflecting surfaces supported on at least a portion of the members of said frame forming a plurality of reflecting units when said frame is erected, means for causing said members to assume an erected position, means for retaining said members in a collapsed position against the action of said erecting means, and means for releasing said retaining means.

17. A reflector for microwave energy comprising a collapsible frame having a plurality of members extending radially from a common center when in an erected position, reflecting surfaces supported on at least a portion of the members of said frame forming a plurality of reflecting units when said frame is erected, means for causing said members to assume an erected position, means for retaining said members in a collapsed position against the action of said erecting means, and inertia responsive means for releasing said retaining means.

18. A reflector for microwave energy comprising a collapsible frame having a plurality of members extending radially from a common center when in an erected position, reflecting surfaces supported on at least a portion of the members of said frame forming a plurality of reflecting units when said frame is erected, means for causing said members to assume an erected position, means for retaining said members in a collapsed position against the action of said erecting means, and means operable upon submergence of said frame in water for releasing said retaining means.

19. A reflector for microwave energy comprising a frame having a plurality of skeleton members extending from a common center, reflecting surfaces supported on at least a portion of the members of said frame forming a plurality of trihedral reflecting units and means for supporting said frame on the surface of a liquid.

20. A collapsible reflector for reflecting electromagnetic radiation comprising a mast, a plurality of support arms pivotally mounted on said mast extending radially equal distances from substantially a common center and at right angles to each other and to the mast thereby positioning the outer extremities of said arms in equally spaced relation to each other, and foraminous metal reflecting units fastened to the outer ends of the arms, the upper extremity of the mast and substantially to a point on the mast adjacent the pivot of the arms, a foraminous metal reflecting means filling the space between the arms and lying in a plane generally perpendicular to the planes of said units thereby providing a cluster of trihedral units when the arms are extended, and means for supporting said mast in a substantially upright position on the surface of a liquid body.

21. A collapsible reflector for reflecting electromagnetic radiation comprising a mast, a plurality of support arms pivotally mounted on said mast extending radially equal distances from substantially a common center and at right angles to each other and to the mast thereby positioning the outer extremities of said arms in equally spaced relation to each other, and foraminous metal reflecting units fastened to the outer ends of the arms, the upper extremity of the mast and substantially to a point on the mast adjacent the pivot of the arms, a foraminous metal reflecting means filling the space between the arms and lying in a plane generally perpendicular to the planes of said units thereby providing a cluster of trihedral units when the arms are extended, a float secured to the central portion of said mast and a weight secured to the lower extremity of said mast.

22. A reflector comprising a mast, a plurality of support arms pivotally mounted on said mast presenting a multiplicity of outwardly projecting apices equidistant from a common center and equally spaced in a common plane perpendicular to the axis of said mast when in an erected position, a plurality of reflector members mounted on said arms and said mast presenting a cluster of trihedral reflector units when in erected position, a collar slidably mounted on said mast, means yieldably biasing said collar away from the points of attachment of said arms to said mast, means connecting each of said arms to said collar whereby said arms are urged toward an erected position, and releasable means for retaining said arms in a collapsed position.

23. A reflector comprising a mast, a plurality of support arms pivotally mounted on said mast presenting a multiplicity of outwardly projecting apices equidistant from a common center and equally spaced in a common plane perpendicular to the axis of said mast when in an erected position, means releasably securing the free end of each of said arms to one end of said mast, thereby securing said arms in a collapsed position, a collar slidably mounted on said mast, means yieldably biasing said collar away from the points of attachment of said arms to said mast, means connecting each of said arms to said collar whereby said arms are urged toward an erected position, releasable means restraining the movement of said collar along said mast, and inertia responsive means adapted to release said arms and said collar from their respective securing means.

24. A reflector as in claim 23, said reflector further comprising a float secured to the central portion of said mast and a weight secured to a second end of said mast.

25. A reflector comprising a partially hollow, collapsible, skeleton frame, a plurality of collapsible triangular reflecting surfaces having the inner apices thereof fastened to said frame at substantially a common point, fastening means symmetrically positioned on said frame for securing the outer apices of said reflecting surfaces thereto, said means being so oriented as to cause said surfaces to present symmetrically disposed trihedral reflector units having substantially mutually perpendicular surfaces upon erection of said frame, and inertia responsive means, including means resiliently biasing said arms toward an erected position, disposed substantially entirely within said frame.

26. A collapsible reflector for reflecting electromagnetic radiation comprising a hollow mast, a plurality of support arms pivotally mounted on said mast presenting a multiplicity of outwardly projecting apices equidistant from a common center and equally spaced in a common plane perpendicular to the axis of said mast when in an erected position, a plurality of reflector members mounted on said arms and said mast presenting a cluster of trihedral reflector units when in an erected position, spring means disposed within said mast and connected to said support arms through flexible connecting means, means for retaining said arms in a collapsed position against the action of said spring means, and inertia responsive means for releasing said retaining means, said retaining means and said releasing means being disposed substantially entirely within said mast.

SERGE E. GOLIAN.
ROBERT M. WHITMER.

REFERENCES CITED

The following references are of record in the file of this patent:

UNITED STATES PATENTS

| Number | Name | Date |
| --- | --- | --- |
| 462,487 | Humbert | Nov. 3, 1891 |
| 634,386 | Zimmerman | Oct. 3, 1899 |
| 935,717 | Williams | Oct. 5, 1909 |
| 1,339,304 | Thompson | May 4, 1920 |
| 1,384,014 | Fessenden | July 5, 1921 |
| 1,635,915 | White | July 12, 1927 |
| 2,072,262 | Herzug et al. | Mar. 2, 1937 |
| 2,181,181 | Gerhard | Nov. 28, 1939 |
| 2,450,417 | Bossi | Oct. 5, 1948 |

FOREIGN PATENTS

| Number | Country | Date |
| --- | --- | --- |
| 18,166 | Great Britain | Aug. 7, 1912 |
| 25,355 | Great Britain | Nov. 5, 1912 |

---

Certificate of Correction

Patent No. 2,534,710            December 19, 1950

SERGE E. GOLIAN ET AL.

It is hereby certified that error appears in the printed specification of the above numbered patent requiring correction as follows:

Column 2, line 51, before the word "means" insert *by*; column 8, line 4, for "skeleton" read *shaftlike*;

and that the said Letters Patent should be read as corrected above, so that the same may conform to the record of the case in the Patent Office.

Signed and sealed this 17th day of July, A. D. 1951.

[SEAL]

ERNEST F. KLINGE,
*Assistant Commissioner of Patents.*